UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

MOLDING COMPOSITION AND PROCESS OF MAKING SAME

No Drawing.   Application filed December 4, 1924.   Serial No. 753,966.

This invention relates to molding compositions containing sulphur as the essential binding agent and to the process of making same and relates particularly to the employment of sulphur in a dispersed form in the preparation of such molding compositions.

When sulphur is ground with water in the presence of a dispersing or peptizing agent, particularly clay material and especially bentonite, the sulphur may be obtained in a dispersed condition which is especially suitable for mixing with a porous or fibrous filler such as sawdust or ground wood.

If the sulphur is melted with the wood or if it is ground therewith without first dispersing it, results of a satisfactory character with respect to strength, finish of the surface and the like are not as advantageously obtained. The dispersed sulphur appears to have the property of impregnating such a porous or fibrous filler, at least to a certain degree and by virtue of such intimate admixture molded products having an excellent surface and relatively high strength result.

In one case 10 parts by weight of bentonite, 90 parts by weight of lump sulphur, 300 parts of water and ½ part of coloring agent were employed. The sulphur was ground with the water in a ball mill for 3 hours, the bentonite added and grinding continued for 3 hours, finally the coloring agent added and the mixture was ground for a further period of one-half hour.

A material so prepared (or prepared in a similar manner if the coloring matter is omitted) is a fine suspension of a creamy consistency, referred to herein as a "dispersion" of sulphur. This creamy mass contains the sulphur in an extremely finely divided state, but the sulphur is not dissolved (as it would dissolve in carbon bisulphide, for example), because the liquid present, water, is not a solvent for sulphur. The suspension of sulphur is quite stable and the minute particles of sulphur and of bentonite are in intimate association. The particles of sulphur are very minute, and are seemingly in a condition approaching colloidal suspension.

50 parts by weight of this dispersion, 50 parts of water and 25 parts of wood flour were mixed and the composition dried in an oven for 3 hours at 105° C.

For molding this mixture was placed in a hot mold pressed at a temperature of 140° C. and a pressure of 1000 pounds and the mold was cooled somewhat before opening. In this way a molded article of smooth finish was obtained.

The proportion of sulphur to ground wood or wood flour may be varied. For example the composition may contain approximately equal parts of sulphur and the ground wood. Other fillers such as various mineral powders, asbestos fibre, cotton flock and the like may be used, also fireproofing agents such as borax, boric acid, ammonium phosphate etc. The dispersion of the sulphur is facilitated by adding a small amount of quick lime. For example 1 part by weight of quick lime to 100 parts of the mixture of bentonite and sulphur. The proportion of bentonite to sulphur may be varied but I prefer to use 1 part or less of bentonite to 9 parts of sulphur in order that the composition may have a good degree of resistance to water. If the proportion of bentonite is much greater than this the molded material is more likely to be affected by water.

Other hydrated clays other than bentonite may be used and in some cases also auxiliary agents such as casein, starch, glue, water glass and the like. Organic agents are however generally undesirable as they are likely to cause the sample to mould if exposed to damp conditions. Bentonite in neutral solution or with an auxiliary binder such as water glass or with an alkaline agents such as calcium hydroxid, barium hydroxid etc. is preferable for most purposes.

The molding composition may be formed into the required shape by placing in a mold, inserting the mold in hot press, pressing to cause the sulphur to flow and then chilling. A preferable mode is that of placing the composition in a mold which has been heated on a hot plate to a temperature sufficient to cause the sulphur to flow, then put the mold immediately in a cold press. The heat of the mold is sufficient to cause the molding composition to form a sharp outline of the mold before cooling action occurs. In this way instead of using two presses the operation can be carried out with a single pressing.

In place of wood flour, sawdust may be employed and one form which has utility is made from cedar sawdust or cedar chips. These are a by-product of cedar saw mills. Some cedar sawdust finds a market, to be used for the extraction of cedar oil, but the demand for this is sufficient to utilize only a small portion of such by-product. The dispersed sulphur affords a cheap binding agent by means of which the cedar chips can be molded into various shapes for example into slabs which may be used as substitute for cedar wood, as wall board for use in making cedar closets or for decorative purposes, for making cedar chests and other purposes for which artificial lumber containing cedar sawdust, shavings or chips is applicable. Also it is possible to mold a layer of the cedar chip composition on a backing of ordinary wood which can be used for any suitable construction. Cedar dust may be employed as pencil stock. For example it may be molded about a core of pencil lead. In this way it may be used as a substitute for the wood commonly employed in making lead pencils.

The cedar chips may be mixed with the dispersed sulphur in any suitable proportion. When the material is to be molded into tablets or other shapes to be employed as a moth repellent it is preferable to have the proportion of sulphur low so as to secure a considerable degree of porosity to allow the oil of cedar to escape gradually. It should be noted that the cedar dust or chips employed for this purpose may be fortified if desired by the addition of oil of cedar. Likewise it is possible to use ordinary wood flour or other wood which does not contain cedar as a medium for carrying cedar oil, such treated wood being made into molding composition with the dispersed sulphur.

On the other hand when the cedar sawdust is to be employed as a molding composition requiring a good finish a higher proportion of sulphur may be used, from one-third the total mixture (dry weight) to equal parts of sulphur and cedar wood or even a larger proportion of sulphur. The water dispersion may be colored with dyestuffs for example a pink or rose color may be employed so that the sulphur binder does not show distinctly in the molded composition. It is often desirable to have the binder as near the color of the wood being imitated as possible.

In accordance with the present invention it is proposed to make a shingle from cedar sawdust chips or other wood sawdust chips, shavings, wood flour, pulp and the like with sulphur preferably with the addition of a fireproofing agent and preferably with the employment of colors, with sulphur, the amount of the latter preferably being at least one-third of the weight of the wood and preferably approximately equal in weight to the wood, in order to secure a sufficient degree of resistance to moisture.

In some cases the wood fragments may be dyed different colors so that when molded a multi-colored shaped article results.

In employing sulphur in a dispersed form for molding purposes experiments have shown that the presence of any substantial amount of moisture in the composition is very liable to cause blackening of the molds, when the latter are of steel or iron. It is therefore desirable to heat or otherwise dry the composition to a state such that it is devoid of discoloring or blackening action on molds. In fact in employing molds of an elaborate character and of expensive construction the cost of upkeep would be considerable if blackening occurred as the fine polished surface of the mold would be destroyed. In the preferred form of the invention such method of drying is not merely desirable but is essential.

The foregoing description has been based on the employment of sulphur in a dispersed form but I do not limit myself to such form as this represents only the preferred embodiment. I include any method of incorporating sulphur with a porous or impregnatable filler which accomplishes very intimate admixture thereby affording products of good strength and desirable surface finish.

By the term "dispersed sulphur" as used herein, I mean sulphur existing in a finely divided condition, mixed with much more than its own amount of a liquid medium in which sulphur is insoluble, such sulphur being in intimate association with a solid material which is more readily wetted by said liquid medium than is sulphur, the said sulphur being readily suspendable in water, after drying, to produce a stable suspension. The original suspension can also be diluted with water to form a stable suspension. By the term "dispersion of sulphur" I mean a fluent suspension containing "dispersed sulphur" (as above defined) in a liquid, e. g. water, in which sulphur is insoluble. By the term "water dispersed" I mean that water is the basis of the liquid in which the dispersion is effected.

What I claim is:—

1. The process of making a molding composition which comprises the steps of grinding sulphur with water and bentonite to form a creamy liquid dispersion and incorporating the latter with comminuted wood.

2. The process which comprises incorporating fragments of wood with a water-dispersion of sulphur in a water-bentonite composition containing a small amount of quicklime.

3. The process of making artificial wood material which comprises incorporating fragments of wood with a water dispersion of sulphur, and hot pressing the resultant material.

4. The process of making artificial wood material which comprises incorporating fragments of wood with a water dispersion of sulphur, drying, hot pressing, and chilling the resultant material.

5. The process which comprises dispersing sulphur in an aqueous medium and intimately mixing such dispersed sulphur in the form of a creamy mass in such aqueous medium, with comminuted wood.

6. A process which comprises grinding sulphur with water and a dispersion-assisting colloid material of the class including hydrated clay, gum tragacanth, and starch, until a creamy aqueous dispersion is formed, drying such dispersion, mixing the same with a wood filler at any convenient stage, and molding the dried mixture under heat and pressure.

7. A process which comprises dispersing sulphur in an aqueous medium, into the form of a substantially smooth creamy mass, and intimately mixing such creamy mass with comminuted wood.

8. A process which comprises dispersing sulphur in an aqueous medium with bentonite, to produce an aqueous creamy mass containing very finely divided sulphur, and incorporating such creamy mass with comminuted wood.

9. The process of making a molding composition which comprises the steps of grinding sulphur with water and bentonite to form a creamy liquid dispersion and incorporating the latter with comminuted cedar wood, drying and hot pressing.

CARLETON ELLIS.